United States Patent
Cassel

[11] 3,863,964
[45] Feb. 4, 1975

[54] PIPE JOINT WITH IMPROVED FASTENER ASSEMBLY

[76] Inventor: Thomas R. Cassel, 226 Shirley, Birmingham, Mich. 48009

[22] Filed: Dec. 16, 1971

[21] Appl. No.: 208,591

[52] U.S. Cl.................. 285/382, 403/281, 403/279
[51] Int. Cl............................................. F16l 19/00
[58] Field of Search............. 285/382, 382.2, 382.1, 285/404, 424, 398, 397, 176, 370; 151/68; 403/361, 373, 279, 378, 281

[56] References Cited
UNITED STATES PATENTS

| | | | |
|---|---|---|---|
| 1,065,492 | 6/1913 | Abbott............................ | 285/404 X |
| 1,881,717 | 10/1932 | Lawrence et al.................. | 285/404 |
| 2,755,107 | 7/1956 | Dow.............................. | 285/404 X |
| 2,989,102 | 6/1961 | Del Pesco et al............. | 151/68 UX |
| 3,413,021 | 11/1968 | Potts............................. | 285/424 X |
| 3,572,778 | 3/1971 | Cassel............................ | 285/382 |

Primary Examiner—Jordan Franklin
Assistant Examiner—Wayne L. Shedd
Attorney, Agent, or Firm—Reising, Ethington & Perry

[57] ABSTRACT

A pipe coupling is disclosed which is especially adapted for vehicle engine exhaust systems and comprises telescopically fitted pipe ends which are preformed with trough shaped deformations which nest together in the initial assembly of the pipe ends. A bolt extends through openings in the pipe walls in the bottom of the deformations and a spacer and nut are disposed on the outer end of the bolt. In final assembly the nut is tightened and the pipes are drawn together in the vicinity of the deformations whereby the outer pipe is stretched around the end of the inner pipe and the bolt and nut retain the pipe ends in the stressed condition to maintain a close fitting engagement. To facilitate assembly and fluid tight sealing the bolt, spacer and nut are mounted on one of the pipe ends and stand-off means are provided to maintain the head of the bolt in spaced relation to the bottom of the deformation. The opening in the other pipe end is in the form of a slot so that the inner pipe may be slidably inserted into the outer pipe until the shank of the bolt seats against the end of the slot. The tightening of the nut to a predetermined torque is effective to draw the bolt through the openings against the resistance of the stand-off means and to draw the pipe ends together in the vicinity of the deformations. The deformations are provided with special configurations to facilitate the drawing together of the walls of the pipe to enlarge the area of engagement and thereby enhance the fluid sealing property of the coupling.

6 Claims, 6 Drawing Figures

PATENTED FEB 4 1975

3,863,964

INVENTOR.
Thomas R. Cassel
BY
McGlynn, Reising, Milton & Ethington
ATTORNEYS

PIPE JOINT WITH IMPROVED FASTENER ASSEMBLY

This invention relates to pipe couplings and more particularly to such couplings adapted especially for fluid conduits such as those used in the engine exhaust systems of automotive vehicles.

In my U.S. Pat. No. 3,572,778 granted Mar. 30, 1971 for "Pipe Coupling" there is disclosed a pipe coupling characterized by telescopically fitted pipe ends with the inner pipe having an inward deformation and the pipes being adapted to be drawn together in the vicinity of the deformation whereby the outer pipe is stretched around the end of the inner pipe and securing means to retain the pipe ends in the stressed condition to maintain a close fitting engagement. The various embodiments of the invention disclosed in my previous patent are quite effective as pipe couplings in providing a strong mechanical joint as well as a good fluid tight seal between pipes.

The present invention is an improvement over the invention referred to above and adapts the pipe coupling for high volume production while retaining the fluid sealing property and mechanical strength of the joint. In particular this invention provides a pipe coupling which is especially adapted to meet the rigorous requirements of the exhaust system of automotive vehicles.

In accordance with this invention, a pipe coupling of the type described is provided, on one of the pipe ends, with a captive fastener assembly which is adapted to receive the other pipe end in a predetermined orientation and position. This is accomplished by mounting a fastener element, such as a bolt, in an opening in the deformation in one of the pipe ends with stand-off means to hold the head of the fastener element in spaced relation to the pipe wall and the other fastener element, such as a nut, is disposed on the other end. A spacer element is suitably disposed between the nut and the deformation in the pipe end. The stand-off means preferably takes the form of an interference fit between a shank portion on the bolt and the boundary of the opening through the deformation of the pipe. In the captive arrangement of the subassembly of the fastener with the pipe end the outer portion of the shank of the bolt extends through the opening in the pipe end into the opening of the spacer when the force exerted thereon by tightening the nut is less than a predetermined value. In this condition the other pipe end with the slot in alignment with the shank portion of the bolt may be inserted into the first pipe end with the head of the bolt inside of the slotted pipe end. When the nut is tightened for final assembly and the force on the bolt exceeds the predetermined value the shank portion is drawn further through the interference fit in the opening in the first pipe and the head engages the wall of the second pipe and thereby draws the pipes together in the vicinity of the deformation. Consequently the outer pipe is stretched around the inner pipe in close fitting engagement therewith.

Further, in accordance with the invention, the spacer is adapted to be self-orienting in its placement on the deformation in the pipe wall and to retain the orientation, as in an automatic assembly operation. Additionally, the spacer is adapted to distribute the stresses of compression and tension in the inner and outer pipes respectively over a wide band. This is accomplished by a noncircular spacer which is of elongated construction with an inner surface which conforms to the configuration of the trough of the deformation in the pipe wall.

Additionally, the pipe coupling of this invention is adapted to produce a fluid tight seal by means of a simple operation of tightening the fastener assembly such as may be done with a power nut runner on an automobile production line. For this purpose the deformation in the outer pipe is in the form of a trough having a main portion of uniform depth and a ramp portion which merges with the undeformed wall of the pipe, while a portion of the metal therebetween is prestretched to form a channel extending transversely of the pipe with a depth greater than that of the main portion of the trough. Accordingly, the pipes in the vicinity of the deformation may be drawn together into sealing engagement with less torque by reason of the prestretched section or channel. Additionally, the trough of the inner pipe deformation is provided with a bottom portion which is concave and with opposed side portions which are convex, thereby assuring greater surface contact with the deformation of the outer pipe as the pipes are drawn together. Furthermore, the ramp portion of the trough in the inner pipe may be provided with a convex curvature so that the contact thereof with the end of the trough in the outer pipe extends over a greater sealing area.

A more complete understanding of the invention may be obtained from the detailed description which follows taken with the accompanying drawings in which.

Figure 1:
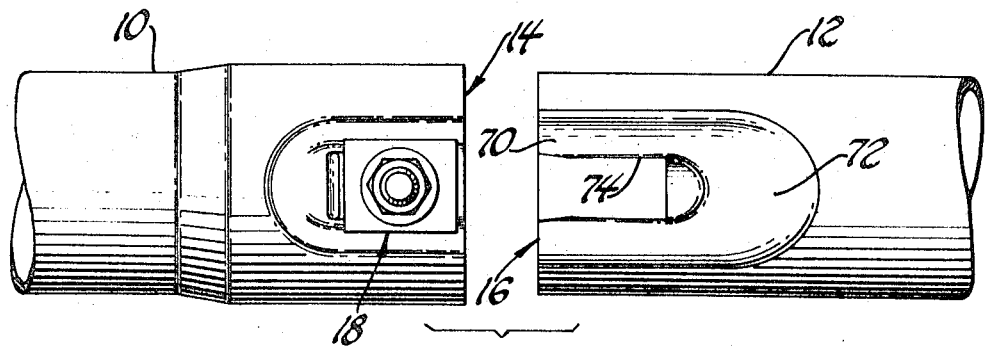
FIG. 1 is an exploded view of the pipe coupling.

Referring now to the drawings, there is shown an illustrative embodiment of the invention in a pipe coupling especially adapted for use in the exhaust system of an automotive vehicle. FIG. 1 of the drawings shows the parts of the pipe coupling in position ready for assembly. The coupling comprises an outer pipe 10 which, as indicated, is sized and preformed, there being a slight enlargement of diameter at the end with an inwardly directed deformation 14 formed therein. An inner pipe 12 is similarly preformed with an inward deformation 16 and any sizing thereof that may be desired. A fastener assembly 18 is mounted in captive relation on the pipe 10 in readiness for engagement with the inner pipe 12 when the same is inserted into the outer pipe 10. The final assembly of the pipe coupling is achieved by tightening of the fastening means 18 which is effective to draw the pipes together in the vicinity of the deformations thereby stretching the outer pipe around the inner pipe and maintaining tensional and compressional stresses respectively in the pipes to form the close fitting fluid sealed pipe coupling.

Figure 2:
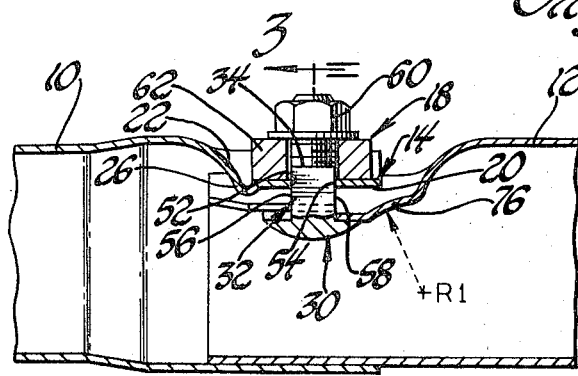
FIG. 2 is a sectional view of the pipe coupling showing the position of the parts prior to final tightening of the fastener.
Figure 3:
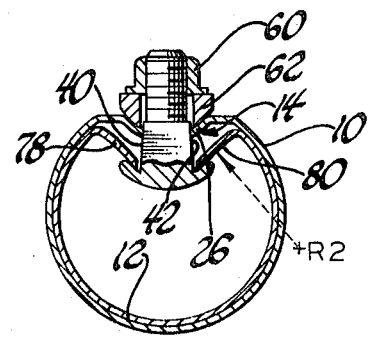
FIG. 3 is a view taken on lines 3—3 of FIG. 2.

FIGS. 2 and 3 show the pipe coupling with the inner pipe 12 inserted into the outer pipe 10 but prior to the final assembly or tightening of the fastener 18. Referring to the outer pipe 10 in greater detail, the deformation 14 forms a trough having a main portion 20 which is of substantially uniform depth and having a ramp portion 22 which merges into the undeformed wall portion of the pipe 10. The main portion 20 of the trough is provided at the bottom thereof with an opening 24, best shown in FIG. 6. The deformation 14 is also provided with a transversely extending channel 26 which is disposed between the ramp portion 22 and the main portion 20 and having a depth greater than the latter. This channel 26 constitutes a prestretched region of the pipe wall which facilitates deformation of the bottom of the trough during final tightening of the fastener means 18. The opening 24 is specially adapted to accommodate the fastening means 18 and will be described in detail subsequently.

Figure 6:
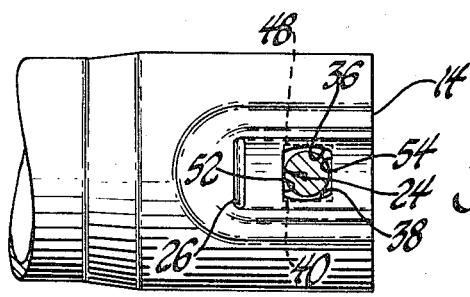
FIG. 6 is a view of one of the pipe ends with parts removed to show details of construction.

The fastener means 18 comprises a bolt 32 formed with a head and threaded shank portion and further provided with a shank portion 32 which is polygonal and preferably rectangular for reasons which will be given presently. The rectangular shank portion extends between the head and the threaded shank portion and terminates in a shoulder 34. Referring again to FIG. 6 for details of the opening 24, it is noted that the polygonal shank portion of the bolt constitutes stand-off means for retaining the bolt head in spaced relation to the deformation in the outer pipe prior to final tightening of the fastening means. The stand-off means in the preferred embodiment is provided by an interference fit between the polygonal shank of the bolt and the boundary of the opening 24 in the deformation 14 which is adapted to accommodate the bolt 30. For this purpose the opposed sides 36 and 38 of the opening 24 are spaced apart somewhat less than the opposed sides or faces 40 and 42 (dashed lines FIG. 6) of the rectangular shank portion of the bolt. Thus an interference fit is provided at the shoulder 34 of the rectangular shank portion and furthermore the interference is increased with insertion of the bolt into the hole by reason of the wedgelike or divergent structure of the opposed sides 40 and 42 of the shank portion, as best shown in FIG. 3. Additionally, as illustrated in FIG. 6, the sides 36 and 38 of the opening 24 are arcuate and outwardly concave in order to provide initial indexing or orientation and improved seating for the shoulder 34 of the bolt. This arcuate shape on the opposed sides of the opening 24 provides relief in the underside of the trough by reason of the curvature of the trough sides to thereby accommodate seating of the shoulder 34 against the underside of the trough. The other pair of sides 52 and 54 of the opening and the remaining faces 56 and 58 of the rectangular shank portion are dimensionally related so as to provide a loose fit of these faces of the shank into the opening. This loose fit of faces 52 and 54 of the shank into the opening, together with the arcuate shape of the sides 36 and 38 adapted for interference fit with faces 40 and 42, provides the previously mentioned relief or clearance which enables the shoulder 34 of the rectangular shank to be inserted into the confines of the opening 24 between the opposed sides 52 and 54 thereof. This insertion of the shoulder 34 of the rectangular shank thus seats the bolt with proper orientation of the head as shown in the drawings. Due to the fact that the shank portion 32 at the shoulder 34 is of greater dimension between faces 36 and 38 than between faces 56 and 58, a bolt can be seated only with the head of the bolt aligned with the troughs in the pipe walls.

Referring again to the fastener means 18, the bolt 30 is provided with a nut, suitably a flare nut 60 on the threaded shank portion of the bolt. A spacer 62 is provided with a clearance hole adapted to accommodate the rectangular shank portion of the bolt in a loose fit and is disposed between the nut deformation 14 in the wall of the pipe 10. The spacer takes the form of an elongated washer having a flat outer surface and an inner surface which conforms to the configuration of the deformation, i.e. the main portion of the trough and preferably extends substantially throughout the length of the trough. The spacer 62 being noncircular is restrained against rotation when the nut 60 is tightened by the sidewalls of the trough or deformation 14.

The inner pipe 12 and the deformation 16 therein will be described in greater detail with reference to FIGS. 1, 2 and 3. The deformation 16 forms a trough with a main portion 70 which is of substantially uniform depth and it includes a ramp portion 72 which merges with the undeformed wall of the pipe. The main portion 70 has a slot 74 in the bottom of the trough which is adapted to accommodate the rectangular shank portion of the bolt 30 when the inner pipe 12 is inserted into the outer pipe 10. It is noted that the inner portion of the slot 74 is formed with parallel edges which are spaced to accept the rectangular shank in a loose fit and the opening of the slot is formed with divergent sides to serve as guide means for the entry of the bolt shank. In order to improve the sealing properties of the coupling the ramp portion 72 is formed with a decreasing depth and as shown with exaggeration in FIG. 2, has a convex portion 76 as indicated by the radius arrow R1. This configuration ensures engagement over a broad area of the end of pipe 10 with the ramp portion 72 of the pipe 12 when the pipes are drawn together by tightening the fastener 18. In a similar manner the sides of the trough or deformation 16 are provided with outwardly convex portions 78 and 80, each of which is indicated by a radius arrow R2. Such curvature enhances the sealing engagement between the sides of the trough or deformation 16 and the trough or deformation 18 when the pipes are drawn together.

Figure 4:
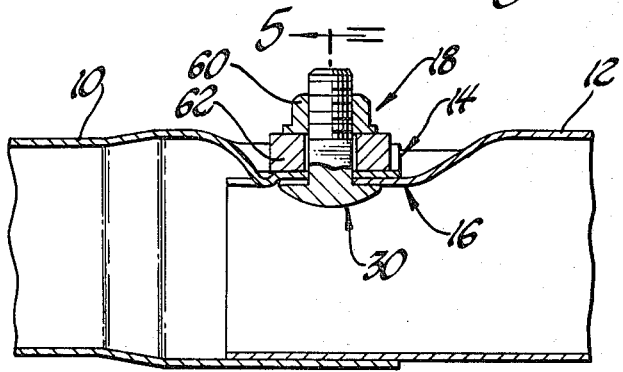
FIG. 4 is a sectional view of the pipe coupling showing the relationship of the parts after final tightening of the fastener.
Figure 5:
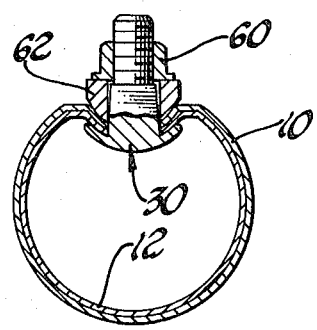
FIG. 5 is a view taken on lines 5—5 of FIG. 4.

As just described with reference to FIGS. 1, 2 and 3, the subassembly of the pipe 10 and the fastener means 18 is adapted for final assembly with the pipe 12. The subassembly with the captive fastener means facilitates handling of the parts on the production line and requires manipulation only of the two pipes which are properly indexed by the deformations therein and the assembly is completed by the tightening of a single fastener. In the subassembly of the fastening means the bolt 30 is inserted into the opening 24 of the outer pipe 10 with the bolt being indexed in proper alignment by the seating of the shoulder 34 in the relief or clearance around the opening 24. With the spacer 62 in position the nut 60 may be hand tightened to hold the subassembly in seated position. In this condition the stand-off means on the rectangular shank of the bolt, i.e. the interference fit provided by the divergent shank faces 40 and 42 prevents the shoulder 34 from entering the opening 24. Additional torquing of the nut 60 as by wrench or nutrunner is effective to increase the force urging the rectangular shank of the bolt into the opening 24. The stand-off means, i.e. the increasing amount of interference is effective to hold the head of the bolt 30 spaced from the deformation 14 sufficiently so that it will be disposed radially inwardly of the deformation 16 until the force exceeds a predetermined value. In this condition the inner pipe 12 may be inserted as shown in FIGS. 2 and 3 into the outer pipe 10 with the slot 74 aligned with the rectangular shank of the bolt until the shank is seated against the end of the slot. To complete the final assembly which is shown in FIGS. 4 and 5 the nut 60 is tightened further so that the torquing thereof is effective to produce a force on the bolt which exceeds the predetermined value mentioned above and draws the bolt further through the opening 24 against the resistance of the increasing interference fit. Accordingly the head of the bolt engages the inner surface of the deformation 16 and a clamping force is exerted between the deformations 14 and 16 which draws the pipes together in that vicinity. As shown in FIGS. 4 and 5 the final assembly is effected by application of a predetermined torque to the nut 60. The inner pipe 12 is in close fitting fluid tight engagement with the outer pipe 10 over a wide band extending circumferentially around the pipes in the vicinity of the deformations. The inner pipe 12 is maintained in a state of compressive stress and the outer pipe 10 is maintained in a state of tensile stress by the force exerted by the fastening means 18.

Although the description of this invention has been given with reference to a particular embodiment, it is not to be construed in limiting sense. Many modifications and variations will now occur to those skilled in the art. For a definition of the invention reference is made to the appended claims.

The embodiments of the present invention in which an exclusive property or privilege is claimed are defined as follows:

1. In a pipe coupling of the type which comprises an inner pipe and outer pipe each having inward deformations adjacent one end, an opening in each of said deformations, a bolt having a head inside the outer pipe and a shank extending outwardly through the opening in the outer pipe, the opening in the inner pipe being a slot extending to the end of the inner pipe to permit insertion of the inner pipe into the outer pipe when the slot is aligned with the bolt, the end of the inner pipe extending into the end of the outer pipe with the deformations in nested relation, a spacer disposed outside the outer pipe with the shank of the bolt extending through an opening in the spacer and a nut threadedly engaging said shank outwardly of said spacer, whereby, upon tightening of the nut, the end of the outer pipe is stretched around the end of the inner pipe in close fitting engagement therewith, the insertion of the inner pipe into the outer pipe being facilitated by the improvement comprising: said shank of the bolt and the wall of the outer pipe surrounding the opening therein constituting an interference fit whereby the head of the bolt is retained in spaced relation to the wall of the outer pipe when the force urging the shank through the opening in the outer pipe is less than a predetermined value thereby permitting the inner pipe to be slidably inserted into the outer pipe with the head of the bolt being spaced inwardly of the inner pipe, said interference fit being yieldable when the nut is tightened to urge said shank through said opening in the outer pipe with a force greater than said predetermined value whereby the head of the bolt is drawn into engagement with the inner pipe and said deformations are drawn together to stretch the outer pipe about the inner pipe.

2. The invention as defined in claim 1 wherein said shank of the bolt includes a portion of polygonal cross-section and at least two opposite sides thereof are divergent toward said head whereby the interference between said shank and the wall of the outer pipe surrounding the opening therein increases as the head is drawn toward the outer pipe.

3. The invention as defined in claim 2 wherein the deformation in each of said pipes is in the form of a trough having a main portion of substantially uniform depth and a ramp portion at the inner end thereof, the head of said bolt has a surface adjacent the shank which substantially conforms to the configuration of the main portion of the trough in said inner pipe.

4. The invention as defined in claim 3 wherein said portion of said shank is rectangular in cross-section, the opening in the outer pipe being rectangular with the pair of sides extending across the deformation being in loose fit with the outer end of the sides of the shank portion whereby the head of the bolt is oriented with reference to said outer pipe.

5. The invention as defined in claim 1 wherein the insertion of the inner pipe into the outer pipe is limited by the engagement of the shank of the bolt with the end of the slot in the inner pipe, said ramp portion on the inner pipe being convex outwardly and disposed opposite the outer end of the main portion of the trough in the outer pipe whereby the engagement of the ramp portion on the inner pipe and the main portion of the trough on the outer pipe is enhanced.

6. The invention as defined in claim 5 wherein the deformation in the outer pipe includes a channel extending transversely of said trough between the main portion and the ramp portion, said channel being deeper than the main portion thereby facilitating the stretching of the outer pipe around the inner pipe.

* * * * *